(12) United States Patent
Yoshida et al.

(10) Patent No.: US 8,453,683 B2
(45) Date of Patent: Jun. 4, 2013

(54) SEALING AND PUMP-UP DEVICE

(75) Inventors: Masaki Yoshida, Kodaira (JP); Yuji Takeda, Kodaira (JP); Ryuji Izumoto, Kodaira (JP); Yusuke Inoue, Kodaira (JP); Takahiko Kojima, Suita (JP)

(73) Assignee: Bridgestone Corporation, Tokyo (JP)

( * ) Notice: Subject to any disclaimer, the term of this patent is extended or adjusted under 35 U.S.C. 154(b) by 724 days.

(21) Appl. No.: 12/665,226

(22) PCT Filed: Jun. 9, 2008

(86) PCT No.: PCT/JP2008/060550
§ 371 (c)(1),
(2), (4) Date: Mar. 1, 2010

(87) PCT Pub. No.: WO2008/156007
PCT Pub. Date: Dec. 24, 2008

(65) Prior Publication Data
US 2010/0186849 A1     Jul. 29, 2010

(30) Foreign Application Priority Data

Jun. 18, 2007 (JP) .................... 2007-160470

(51) Int. Cl.
*B65B 31/00* (2006.01)
*B60C 23/10* (2006.01)
*B29C 73/16* (2006.01)
*B60C 23/00* (2006.01)

(52) U.S. Cl.
CPC ............. *B29C 73/166* (2013.01); *B60C 23/003* (2013.01)
USPC .............. 141/38; 141/105; 141/330; 152/415

(58) Field of Classification Search
USPC ....... 141/38, 67, 105, 114, 231, 330; 152/415
See application file for complete search history.

(56) References Cited

U.S. PATENT DOCUMENTS

| | | | | |
|---|---|---|---|---|
| 4,765,367 | A | * | 8/1988 | Scott .............................. 137/607 |
| 6,019,145 | A | * | 2/2000 | Savidge .......................... 141/38 |

(Continued)

FOREIGN PATENT DOCUMENTS

| | | |
|---|---|---|
| JP | 2000-238144 A | 9/2000 |
| JP | 2000-309254 A | 11/2000 |
| JP | 2001-505501 A | 4/2001 |
| JP | 2005-508774 A | 4/2005 |
| JP | 2005-199618 A | 7/2005 |
| JP | 2005-335155 A | 12/2005 |
| JP | 2007-062093 A | 3/2007 |
| JP | 2007-112113 A | 5/2007 |
| WO | 2007/063852 A1 | 6/2007 |

OTHER PUBLICATIONS

Chinese Office Action issued in Chinese Application No. 200880020937.8, dated Jul. 28, 2011.
International Search Report PCT/JP2008/060550, Sep. 2, 2008.

Primary Examiner — Timothy L Maust
(74) Attorney, Agent, or Firm — Sughrue Mion, PLLC

(57) ABSTRACT

A sealing and pump-up device (10) includes: a liquid agent container (18) containing a sealing agent (32); an injection unit (20) that is connected to an outlet (29) of the liquid agent container (18) and has a liquid pressurization and supply chamber (40) and a jig insertion hole (44); a jig (82) that by insertion into the jig insertion hole (44) pierces an aluminum seal (30) by means of a piercing member (62) and closes off the jig insertion hole (44); and a leading end portion (85), of an insertion portion (84), having a step (85A) that catches on an edge (44B) of a jig insertion hole (44) before the jig (82) that has been inserted into the jig insertion hole (44) reaches a piercing position, when the aluminum seal (30) is pierced.

9 Claims, 14 Drawing Sheets

U.S. PATENT DOCUMENTS

| | | | |
|---|---|---|---|
| 6,283,172 B1 * | 9/2001 | Thurner | 141/38 |
| 6,766,834 B1 * | 7/2004 | Eckhardt | 141/38 |
| 6,889,723 B2 * | 5/2005 | Gerresheim et al. | 141/38 |
| 6,964,284 B2 * | 11/2005 | Eckhardt | 141/38 |
| 7,178,564 B2 * | 2/2007 | Kojima et al. | 141/38 |
| 7,389,800 B2 * | 6/2008 | Hickman et al. | 141/26 |
| 8,016,002 B2 * | 9/2011 | Yoshida et al. | 141/38 |
| 8,201,586 B2 * | 6/2012 | Yoshida et al. | 141/38 |
| 8,297,321 B2 * | 10/2012 | Chou | 141/38 |
| 2004/0216806 A1 * | 11/2004 | Eckhardt | 141/38 |
| 2009/0277534 A1 * | 11/2009 | Yoshida et al. | 141/38 |

\* cited by examiner

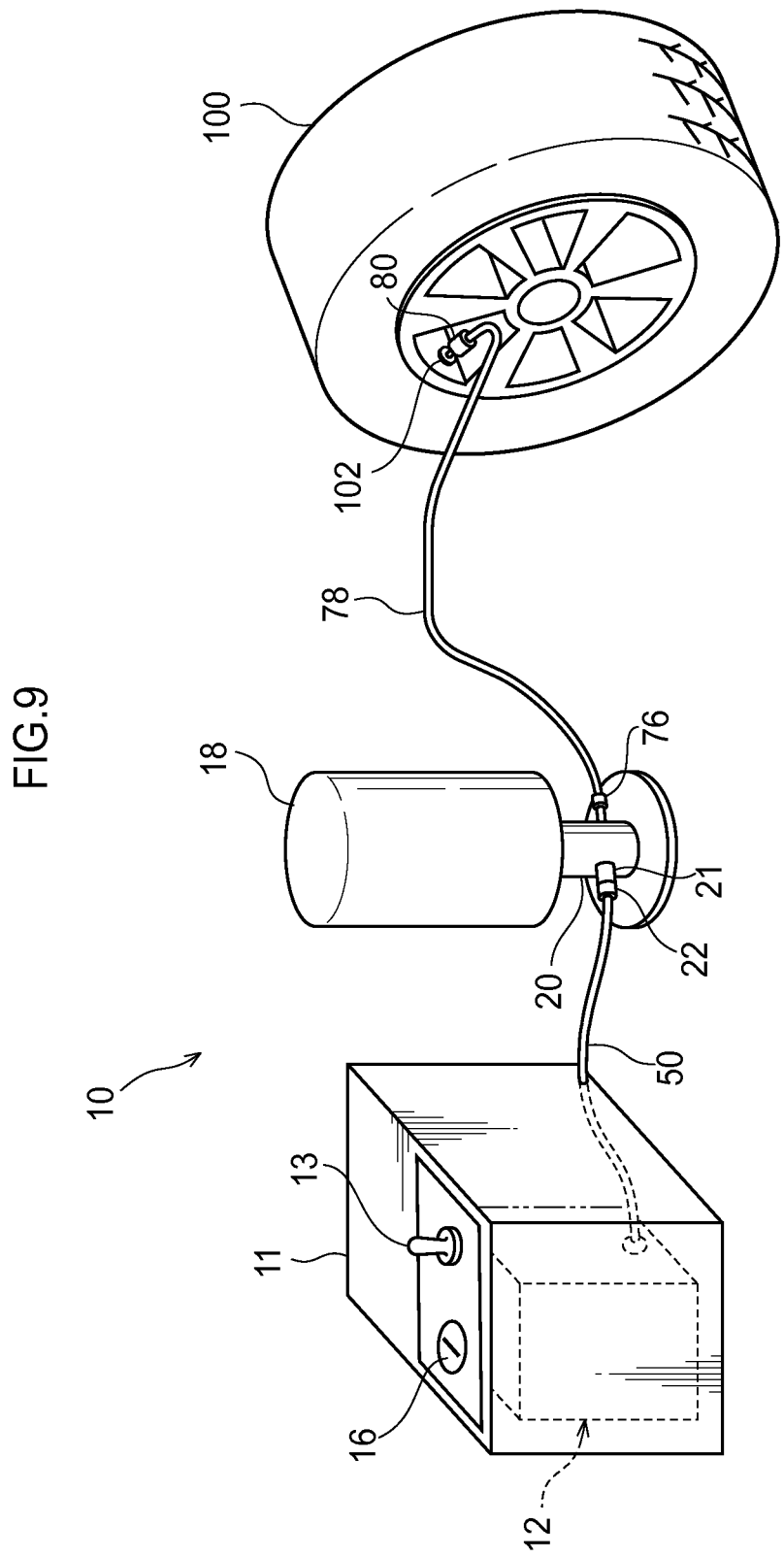

SEALING AND PUMP-UP DEVICE

CROSS REFERENCE TO RELATED APPLICATIONS

This application is a National Stage of International Application No. PCT/JP2008/060550 filed Jun. 9, 2008, claiming priority based on Japanese Patent Application No. 2007-160470, filed Jun. 18, 2007, the contents of all of which are incorporated herein by reference in their entirety.

TECHNICAL FIELD

The present invention relates to a sealing and pump-up device that injects a sealing agent for sealing punctured pneumatic tires into a pneumatic tire, and that supplies compressed air into the pneumatic tire, raising the internal pressure of the pneumatic tire.

RELATED ART

Recently, sealing and pump-up devices are becoming common which, when pneumatic tires (referred to below simply as tires) are punctured, repair the tire with a sealing agent, without changing the tire and the wheel. The sealing and pump-up device described in Patent Document 1, for example, is a known example of such a sealing and pump-up device.

In the sealing and pump-up device disclosed in Patent Document 1, a switching tool (jig) is utilized to open a hole in the lid of a container filled with a sealing agent, and then compressed air is supplied, pushing the sealing agent out, the sealing agent that has been pushed out is filled into the tire, and air is filled after the sealing agent has been filled.

Patent Document 1: Japanese Patent Application Laid-Open No. 2005-199618.

DISCLOSURE OF THE INVENTION

Problem to be Solved by the Invention

However, in the sealing and pump-up device described in Patent Document 1, operation of the switching tool is complicated, with an external thread being formed to the switching tool, the switching tool being progressed toward the lid by rotating a handle of the switching tool, and leading end piercing portions provided at the leading end of the switching tool so as to pierce through the lid. From another perspective, since pressure continues to act on the switching tool, effective prevention is required to stop it coming out.

An object of the present invention is, in consideration of the above issues, to provide a reliable operable sealing and pump-up device with simple jig installation and in which the jig does not come out even when subjected to pressure.

Method of Solving the Problem

In order to achieve the above objective, the sealing and pump-up device according to the first aspect of the present invention is configured by a sealing and pump-up device including: a liquid agent container for containing a sealing agent and having an outlet for the sealing agent closed by a seal member; an injection unit connected to the outlet and having a liquid supply chamber that is in communication with the inside of the liquid agent container by piercing a hole in the seal member, and a jig insertion hole that communicates the liquid supply chamber with the outside; compressed air supply means that generates compressed air for applying pressure to the sealing agent and for filling a pneumatic tire; an air and liquid supply tube that supplies sealing agent that has flowed out from the liquid supply chamber and compressed air to the pneumatic tire; a jig that is insertable into the jig insertion hole, and by insertion into the jig insertion hole, directly or indirectly via another member, pierces a hole in the seal member and also closes off the jig insertion hole; and first prevention means that, when the jig is in a position inserted into the jig insertion hole and before the hole piercing position of the jig when the seal member is pierced, functions to prevent movement of the jig in the removal direction, the first prevention means including a first engaged portion formed to the injection unit, and a first catching portion provided to the jig so as to catch on the first engaged portion to prevent movement in the removal direction of the jig that has been inserted in the jig insertion hole.

According to the sealing and pump-up device of the first aspect, a hole is pierced in the seal member of the liquid agent container by insertion of the jig into the jig insertion hole, either directly by the jig or indirectly via another member, the inside of the liquid agent container is made in communication with the liquid supply chamber, and the sealing agent flows out from the liquid agent container into the liquid supply chamber. Compressed air generated by the compressed air supply means acts on the sealing agent that has flowed out, and the sealing agent can be supplied into a pneumatic tire via the air and liquid supply tube. Compressed air can also be supplied to the pneumatic tire via the air and liquid supply tube. After sealing agent and compressed air have been supplied to the pneumatic tire, the sealing agent fills the puncture hole by performing stipulated running. After stipulated running, the air pressure is confirmed, and compressed air is refilled when required. Repair of the pneumatic tire is thereby completed.

The jig here is provided with the first catching portion capable of catching on the first engaged portion formed to the injection unit, and, by simple operation of the jig being inserted into the jig insertion hole and the first catching portion catching on the first engaged portion, movement in the removal direction of the jig that has been inserted in the jig insertion hole can be prevented by. Furthermore, the jig insertion hole can be closed off by insertion of the jig into the jig insertion hole. By so doing, sealing agent and compressed air can be prevented from leaking from the jig insertion hole.

Furthermore, since the first prevention means functions from the state in which the position of the jig is inserted into the jig insertion hole, before arriving at the hole piercing position of the jig when a hole is pierced in the seal member, the first prevention means is in a state to reliably function when a hole is actually pierced in the seal member, and the jig can be reliably prevented from coming out of the jig insertion hole after the hole has been pierced in the seal member.

The sealing and pump-up device according to the second aspect of the present invention is the sealing and pump-up device of the first aspect, wherein: the first engaged portion is an edge portion at the liquid supply chamber side of the jig insertion hole; and the first catching portion is provided to an insertion portion of the jig for insertion into the jig insertion hole, and is capable of catching on the edge portion on the liquid supply chamber side of the jig insertion hole after insertion through the jig insertion hole.

According to the sealing and pump-up device of the second aspect, the first catching portion provided to the insertion portion of the jig is capable of catching on the edge portion at the liquid supply chamber side of the jig insertion hole after passing through the jig insertion hole. Consequently, even if force acts in the removal direction on the insertion portion of the jig after the first catching portion has passed through the jig insertion hole, since the first catching portion catches on the edge portion at the liquid supply chamber side of the jig insertion hole, any further movement in the removal direction is prevented. Since the first catching portion employed here is the edge portion of the liquid supply chamber side of the jig insertion hole, there is no need for provision of a dedicated catching portion.

The sealing and pump-up device according to the third aspect of the present invention is the sealing and pump-up device of the first aspect, wherein: by insertion of the insertion portion into the jig insertion hole, a leading end side of the insertion portion passes through the hole-pierced seal member and intrudes into the liquid agent container and the insertion portion has an internal communication path that guides the compressed air that has been generated into the liquid agent container in a state in which the leading end side intrudes into the liquid agent container; and the insertion portion is equipped with second prevention means that prevents movement of the jig in the removal direction when in a state in which the leading end side of the insertion portion is intruding into the liquid agent container. The sealing and pump-up device according to the fifth aspect of the present invention is the sealing and pump-up device of the second aspect, wherein: by insertion of the insertion portion into the jig insertion hole, a leading end side of the insertion portion passes through the hole-pierced seal member and intrudes into the liquid agent container and the insertion portion has an internal communication path that guides the compressed air that has been generated into the liquid agent container in a state in which the leading end side intrudes into the liquid agent container; and the insertion portion is equipped with second prevention means that prevents movement of the jig in the removal direction when in a state in which the leading end side of the insertion portion is intruding into the liquid agent container.

According to the sealing and pump-up device recited in the third aspect and fifth aspect, a hole is pierced in the seal member by insertion of the insertion portion of the jig into the jig insertion hole, and the leading end side of the insertion portion passes through the hole-pierced seal member and intrudes into the liquid agent container. Then compressed air that has been generated by the compressed air supply means is guided by the communication path and supplied into the liquid agent container. When this occurs, since this is in a state in which the leading end side of the insertion portion is intruding into the liquid agent container, movement of the jig in the removal direction is prevented by the second prevention means, the compressed air can be directly supplied into the liquid agent container via the communication path, and the time for pressure to operated on the sealing agent in the liquid agent container and for the sealing agent to flow out into the liquid supply chamber can be shortened.

The sealing and pump-up device according to the fourth aspect of the present invention is the sealing and pump-up device of the third aspect, wherein: the jig is configured including an extending portion provided to a base portion of the insertion portion and extending in directions orthogonal to the axial direction of the insertion portion on both sides of the insertion portion with the insertion portion therebetween, and including first support columns formed at the two sides of the extending portion and provided at the side of the jig that is provided with the insertion portion; and the second prevention means is configured including a projection portion projecting out from the injection unit, and including a second claw formed at the leading end side of the first support column and extending toward the insertion portion side so as to catch on an edge portion of the projection portion such that movement of the insertion portion that has been inserted into the jig insertion hole is prevent in the removal direction. The sealing and pump-up device according to the sixth aspect of the present invention is the sealing and pump-up device of the fifth aspect, wherein: the jig is configured including an extending portion provided to a base portion of the insertion portion and extending in directions orthogonal to the axial direction of the insertion portion on both sides of the insertion portion with the insertion portion therebetween, and including first support columns formed at the two sides of the extending portion and provided at the side of the jig that is provided with the insertion portion; and the second prevention means is configured including a projection portion projecting out from the injection unit, and including a second claw formed at the leading end side of the first support column and extending toward the insertion portion side so as to catch on an edge portion of the projection portion such that movement of the insertion portion that has been inserted into the jig insertion hole is prevent in the removal direction.

According to the sealing and pump-up device recited in the fourth aspect and the sixth aspect, the jig is inserted into the jig insertion hole, the leading end side of the jig is intruding into the liquid agent container, and also the second claw catches on an edge of the projection portion. Movement of the jig in the removal direction is thereby prevented, and a state is maintained with the leading end side of the jig intruding into the liquid agent container. When pressure from compressed air acts here on the insertion portion that has been inserted into the jig insertion hole, the insertion portion presses a central portion of the extending portion, and bending deformation occurs such that the extending portion deforms, about the second claw portions on both sides as fulcra, so that the central portion protrudes. When such bending deformation occurs in the extending portion, the first support columns tilt in the direction to press the edges of the extending portion, and a desirable mode is obtained in which the catching of the second claws onto the edge portions of the extending portion tends to get stronger.

The sealing and pump-up device according to the seventh aspect of the present invention is the sealing and pump-up device of the first aspect, wherein: the jig is configured including an insertion portion for insertion into the jig insertion hole, and an extending portion provided to a base portion of the insertion portion and extending in directions orthogonal to the axial direction of the insertion portion and on both sides of the insertion portion with the insertion portion therebetween, and including first support columns formed at the two sides of the extending portion and provided at the side of the jig that is provided with the insertion portion; and the first engaged portion is an edge portion of a projection portion projecting out from the injection unit, and the first catching portion is provided to the leading end side of the first support columns and extending toward the insertion portion side so as to catch on the edge portion of the projection portion.

According to the sealing and pump-up device recited in the seventh aspect, when in a state in which the first prevention means functions, if removal pressure is exerted on the insertion portion, the first catching portions catch on the edge of the projection portions, the insertion portion presses a central portion of the extending portion, and bending deformation occurs such that the extending portion deforms, about the first catching portions as fulcra on both sides of the extending portion, so that the central portion protrudes. When such bending deformation occurs in the extending portion, the first support columns tilt in the direction to press the edges of the extending portion, and a desirable mode is obtained in which the catching of the first catching portions onto the edge portions of the extending portion tends to get stronger.

The sealing and pump-up device according to the eighth aspect of the present invention is the sealing and pump-up device of the seventh aspect, wherein: by insertion of the insertion portion into the jig insertion hole, a leading end side of the insertion portion passes through the hole-pierced seal member and intrudes into the liquid agent container and the insertion portion has an internal communication path that guides the compressed air that has been generated into the liquid agent container in a state in which the leading end side intrudes into the liquid agent container; and the insertion portion is equipped with second prevention means that prevents movement of the jig in the removal direction when in a state in which the leading end side of the insertion portion is intruding into the liquid agent container.

According to the sealing and pump-up device recited in the eighth aspect a hole is pierced in the seal member by insertion of the insertion portion of the jig into the jig insertion hole, and the leading end side of the insertion portion passes through the hole-pierced seal member and intrudes into the liquid agent container. Compressed air that has been generated by the compressed air supply means is guided by the communication path and supplied into the liquid agent container. When this occurs, since this is in a state in which the leading end side of the insertion portion is intruding into the liquid agent container, movement of the jig in the removal direction is prevented by the second prevention means, the compressed air can be directly supplied into the liquid agent container via the communication path, and the time for pressure to operated on the sealing agent in the liquid agent container and for the sealing agent to flow out into the liquid supply chamber can be shortened.

The sealing and pump-up device according to the ninth aspect of the present invention is the sealing and pump-up device of the eighth aspect, wherein: the jig has second support columns provided on both sides of the extending portion, further to the insertion portion side than the first support columns; and the second prevention means includes holes formed to the injection unit and second claws formed to the leading end side of the second support columns, the second claws extending in directions toward the opposite sides to those of the insertion portion side so as to catch on an edge portion of the holes, or on an inner peripheral face of the holes, so as to prevent the insertion portion that has been inserted into the jig insertion hole from moving in the removal direction.

According to the sealing and pump-up device recited in the ninth aspect, the jig is inserted into the jig insertion hole, and the second claws catch on an edge of the holes or on an inner peripheral face of the holes. When this occurs, the leading end side of the jig is in a state intruding into the liquid agent container. Namely, a state is maintained in which movement of the jig in the removal direction is prevented and the leading end side of the jig is intruding into the liquid agent container.

Effect of the Invention

As explained above, the sealing and pump-up device of the present invention is reliable operable sealing and pump-up device with simple jig installation and in which the jig does not come out even when subjected to pressure.

BRIEF DESCRIPTION OF THE DRAWINGS

FIG. 9 is a schematic explanatory diagram of a sealing and pump-up device according to another exemplary embodiment.

BEST MODE OF IMPLEMENTING THE INVENTION

First Exemplary Embodiment

Explanation will now be given of a sealing and pumping device according to a first exemplary embodiment of the present invention.

Figure 1:
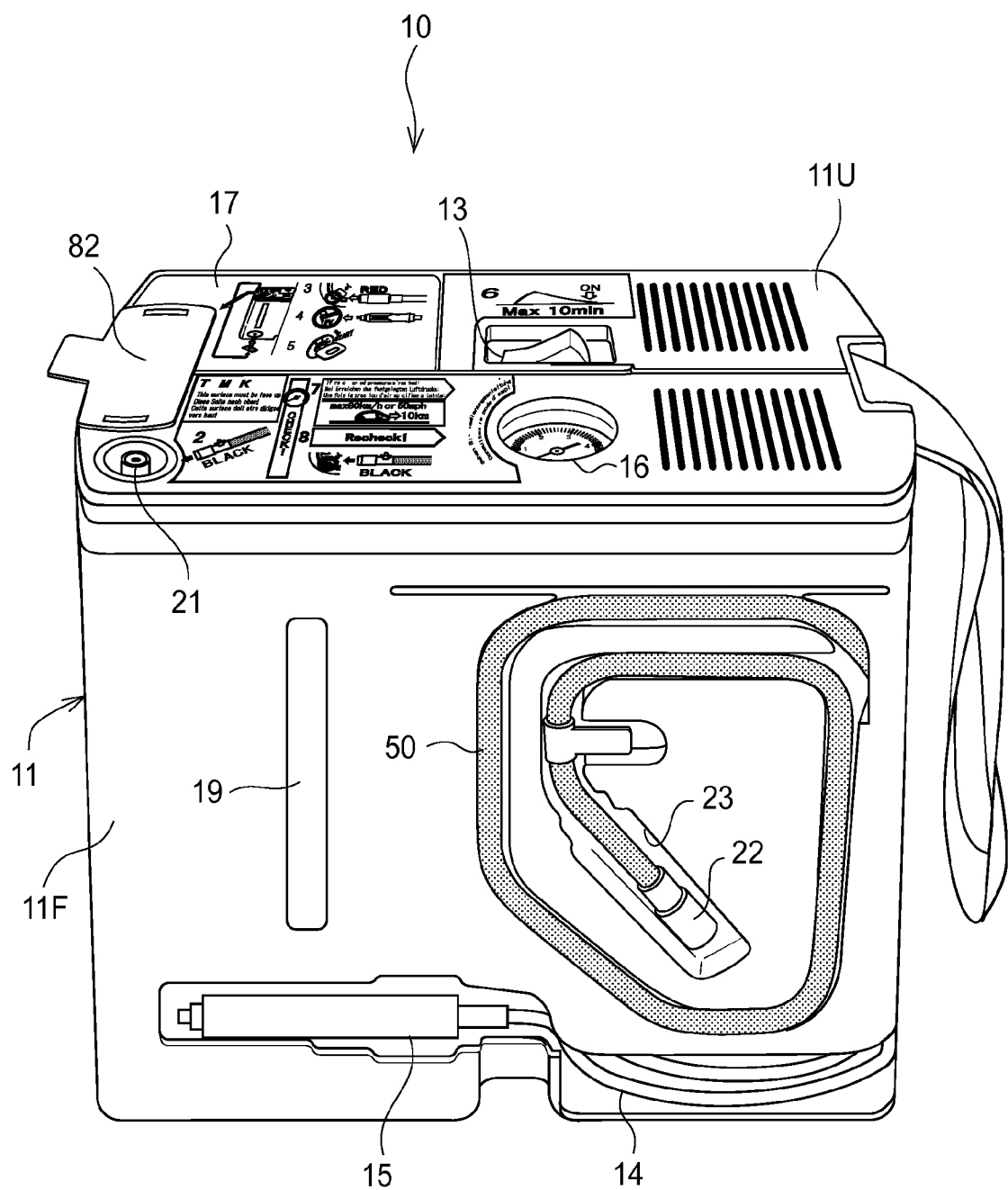
FIG. 1 is a perspective view of a sealing and pumping device according to a first exemplary embodiment of the present invention, as viewed from the front face side.
Figure 2:
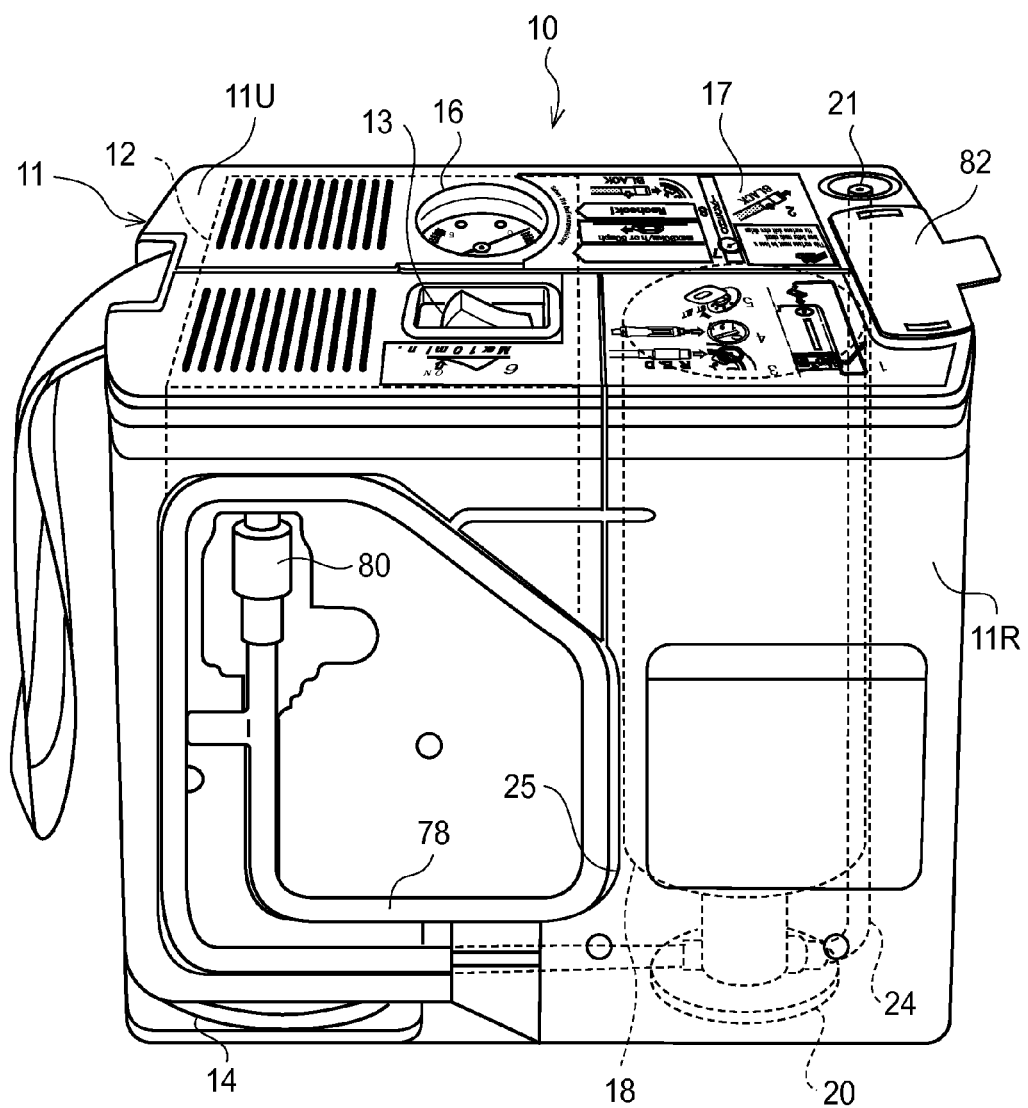
FIG. 2 is a perspective view of a sealing and pumping device according to a first exemplary embodiment of the present invention, as viewed from the rear face side.

When a pneumatic tire (referred to below simply as tire) mounted to a vehicle, such as a car or the like, is punctured, a sealing and pump-up device 10 according to the first exemplary embodiment of the present invention, as shown in FIG. 1 and FIG. 2, is a device for repairing the tire with a sealing agent and re-pressurizing (pumping up) the internal pressure to a specific specified pressure, instead of changing the tire and the wheel.

The sealing and pump-up device 10 is equipped with a casing 11 as an outer shell. A compressor unit 12 (compressed air supply means), an injection unit 20, and a liquid agent container 18 that is connected to the injection unit 20, are disposed within this casing 11.

A motor, an air compressor, a power circuit, a control board and the like are disposed within the compressor unit 12, and a power source cable 14 is provided extending from the power circuit to outside of the unit. Power can be supplied to the motor and the like from a battery mounted to a vehicle through the power circuit, by, for example, inserting a plug 15 provided at the leading end of the power source cable 14 into the socket of a cigarette lighter installed in the vehicle. The air compressor of the compressor unit 12 here is capable of generating compressed air at a pressure higher than the stipulated pressure for each of various types of tire 100 to be repaired (see FIG. 4A and FIG. 4B) (for example at 300 kPa or above).

The compressor unit 12 is equipped with a power switch 13 and a pressure gauge 16, with the power switch 13 and the pressure gauge 16 disposed in the vicinity of a central portion of a top face 11U of the casing 11. Also disposed on the top face 11U of the casing 11 are an operation manual 17 for explaining the operating procedure, a jig housing hole, not illustrated, for attaching a jig 82, described later, and a connection aperture 21, described later.

Figure 3A:
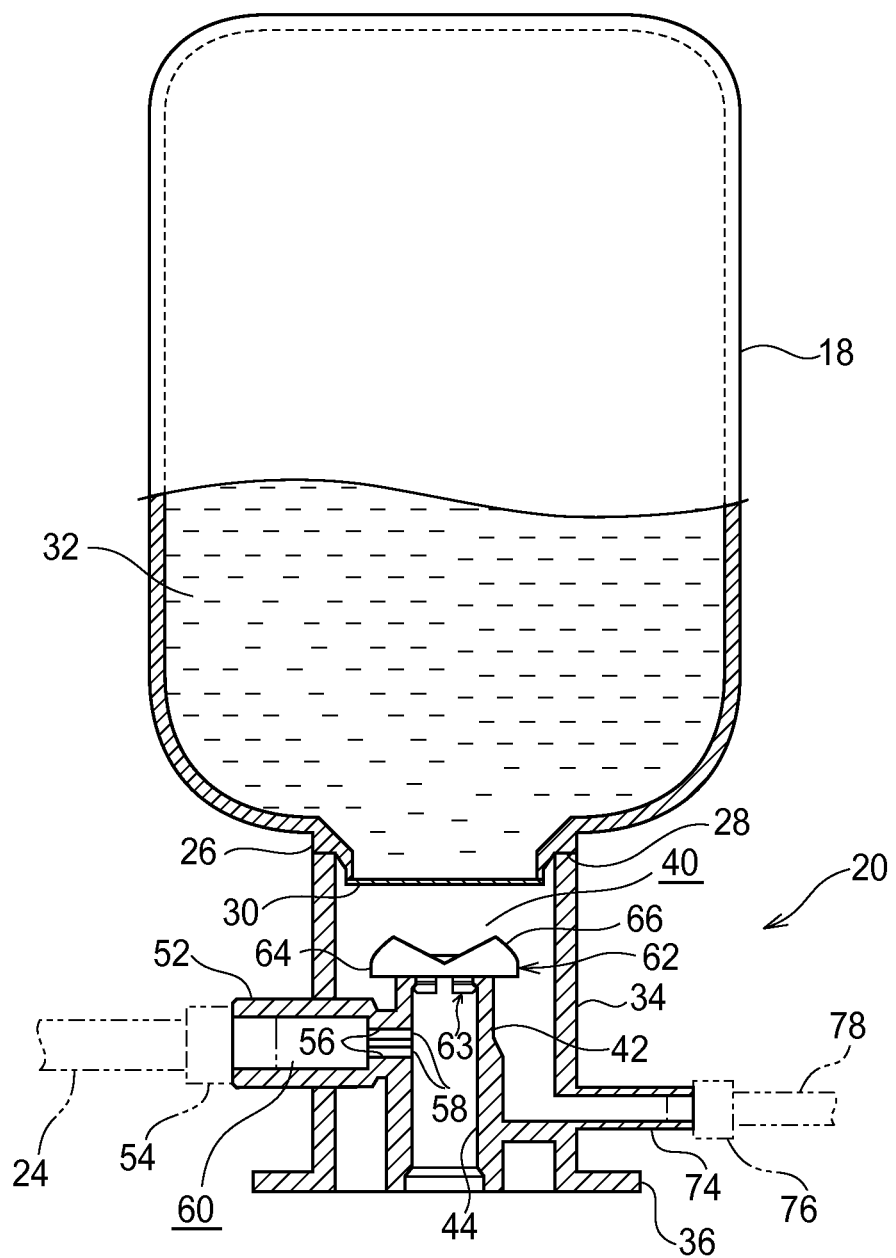
FIG. 3A is a cross-section showing a configuration of a liquid agent container, an injection unit, a hole piercing member, and a jig in a sealing and pumping device.

As shown in FIG. 3A, the sealing and pump-up device 10 is provided with the liquid agent container 18 containing a sealing agent 32, and with the injection unit 20 that is connected to the liquid agent container 18. A neck portion 26 is integrally formed to a portion at the bottom end of the liquid agent container 18, the neck portion 26 being substantially a circular cylinder shape projecting downwards. The neck portion 26 is formed with a diameter narrower than that of a body portion of the container above the top end of the neck portion 26. An outlet 29, for letting the sealing agent 32 flow to an external portion (a liquid pressurization and supply chamber 40, described later), is formed to a portion at the bottom end of the neck portion 26. As an example of a seal member, an aluminum seal 30 is disposed across the outlet 29 of the neck portion 26, in order to seal (contain) the sealing agent 32 within the liquid agent container 18. The outer peripheral edge portion of the aluminum seal 30 is fixed around the whole of the peripheral edge of the outlet 29 of the neck portion 26, by use of an adhesive or the like. A step 28 is formed at an intermediate portion of the neck portion 26, projecting out toward the peripheral outside.

The liquid agent container 18 is formed from a material with gas blocking characteristics, such as various resin materials or metal materials such as aluminum alloys or the like. Slightly more sealing agent 32 is filled within the liquid agent container 18 than a standard amount (for example 200 g to 400 g) corresponding to the type, size and the like of the tire 100 requiring repair by the sealing and pump-up device 10. It should be noted that the liquid agent container 18 of the present exemplary embodiment is filled with the sealing agent 32 with no voids therein and without provision of an air space, however a small amount of an inert gas such as Ar or the like may be sealed together with the sealing agent 32 within the liquid agent container 18 when filling, in order to prevent alternation of the sealing agent 32 by oxidation or the like.

When the sealing and pump-up device 10 of the present exemplary embodiment is placed in a state in which the liquid agent container 18 is positioned directly above the injection unit 20, the aluminum seal 30 of the liquid agent container 18 is in a pressure applied state due to the weight of the sealing agent 32 itself within the liquid agent container 18.

Figure 3B:
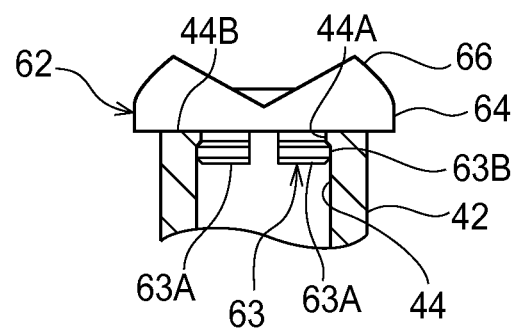
FIG. 3B is an enlarged diagram of the hole piercing member and the jig insertion hole of FIG. 3A.

As shown in FIG. 3A and FIG. 3B, a unit main body portion 34 and a foot portion 36 are integrally provided in the injection unit 20. The unit main body portion 34 is formed in a substantially circular bottomed cylinder shape, open toward the top, and the foot portion 36 of a circular flange shape is integrally provided extending out to the outer peripheral side from a portion at the bottom of the unit main body portion 34. The neck portion 26 of the liquid agent container 18 is welded to the unit main body portion 34, by a method such as by inserting the bottom end of the neck portion 26 at the inner peripheral side of the unit main body portion 34, and spin welding the top face of the unit main body portion 34 to the step 28 of the neck portion 26. Note that the foot portion 36 is one example of an extending portion.

A substantially circular column shaped liquid pressurization and supply chamber 40 is provided inside the unit main body portion 34, and when the aluminum seal 30 is pierced (a hole is punctured) the liquid pressurization and supply chamber 40 is in communication with the inside of the liquid agent container 18. A substantially circular cylinder shaped inner peripheral tubular portion 42 is formed to the injection unit 20 coaxially at the peripheral inside of the unit main body portion 34. A jig insertion hole 44 is formed with a circular cross-section at a central portion of the inner peripheral tubular portion 42, passing through from the bottom end face of the injection unit 20 to the top end face of the inner peripheral tubular portion 42 (see FIG. 5B).

Figure 4A:
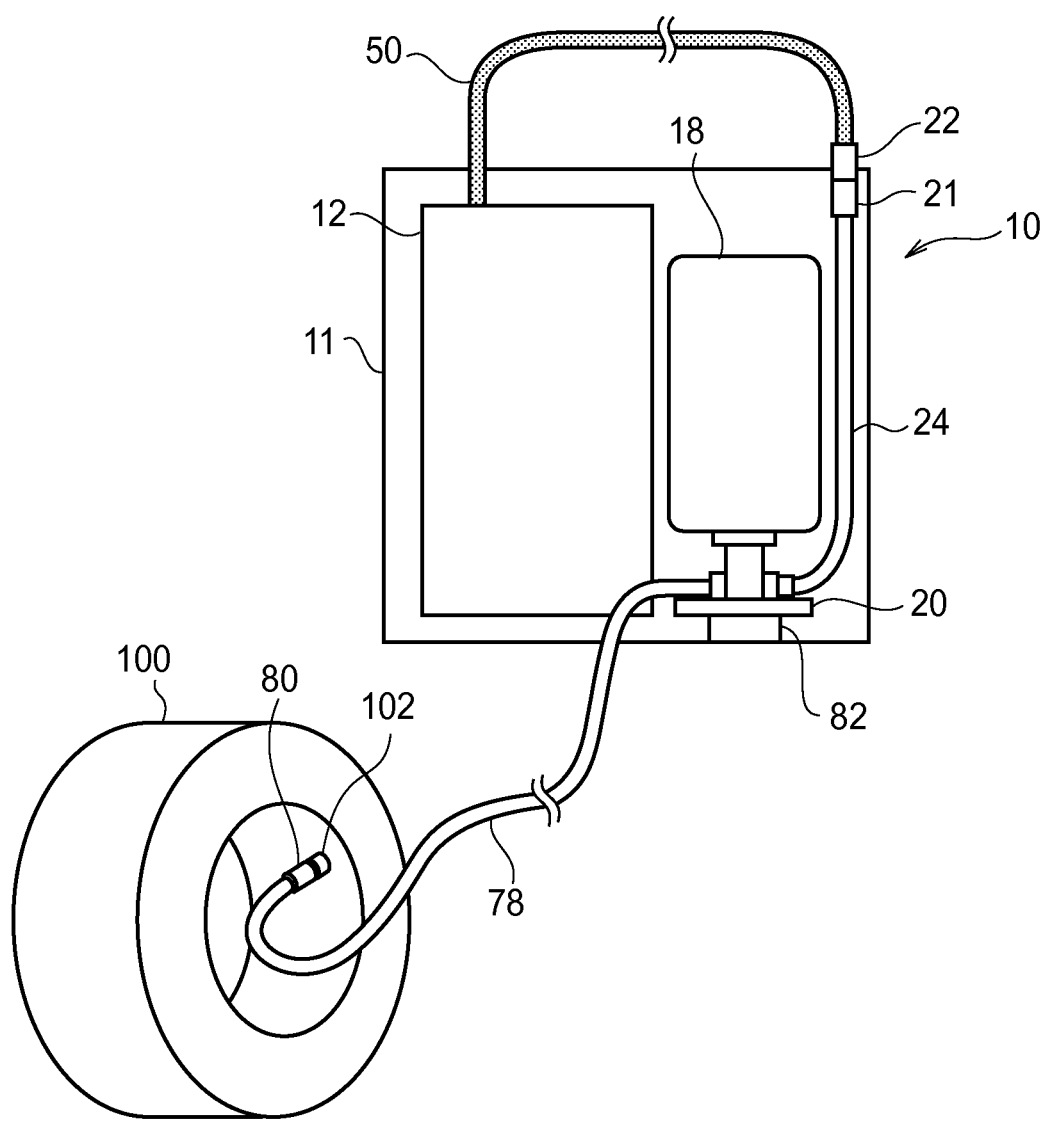
FIG. 4A is a configuration diagram of main portions showing a state in which a joint hose has been connected to a tire valve of a pneumatic tire.
Figure 4B:
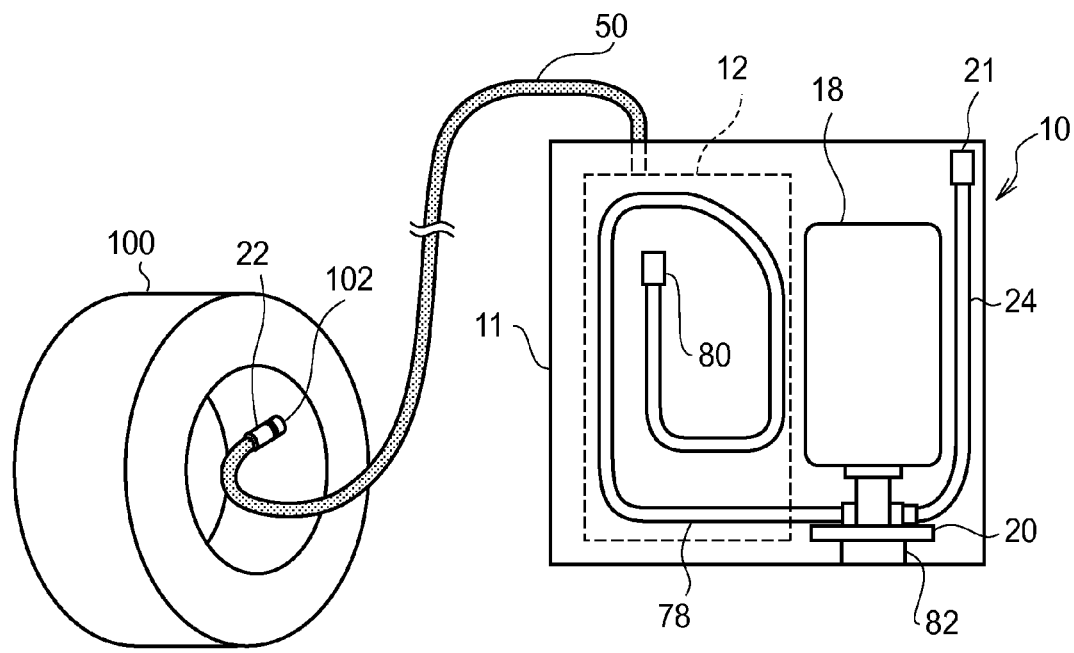
FIG. 4B is a configuration diagram of main portions showing a state in which an air hose has been connected to a tire valve of a pneumatic tire.

As shown in FIG. 1, FIG. 4A and FIG. 4B, in the sealing and pump-up device 10, a black air hose 50 is provided extending out from the compressor unit 12, and portion at the base end of the air hose 50 is connected to the air compressor in the compressor unit 12. A valve adapter 22 is fitted to the distal end of the air hose 50, the valve adapter 22 being connectable to a tire valve 102 of a tire 100, and to a connection aperture 21, described later.

As shown in FIG. 1, a groove 23 is formed in a front wall face 11F of the casing 11, for storing the air hose 50 and the valve adapter 22, and the air hose 50 and the valve adapter 22 are usually fitted into and stored in the groove 23.

Furthermore, as shown in FIG. 1, an observation window 19 is formed in the casing 11 for looking into the casing 11 from the front wall face 11F side. The liquid agent container 18 is disposed behind the observation window 19, and the height of the liquid surface of the sealing agent 32 can be seen through the observation window 19.

As shown in FIG. 3A, a circular cylindrical shaped air supply tube 52 is formed to the injection unit 20, piercing through the unit main body portion 34 from the outer peripheral face of the inner peripheral cylindrical portion 42 and extending out to the outer peripheral side. The leading end at the outer peripheral side of the air supply tube 52 is connected to one end portion of a high pressure hose 24 through a nipple 54. However, the other end portion of the high pressure hose 24 is, as shown in FIG. 2, connected to the connection aperture 21 provided on the top face 11U of the casing 11. In this manner, when the device is in an upright state, the connection aperture 21 is obviously positioned higher than the liquid surface of the sealing agent 32 contained in the liquid agent container 18(see FIG. 4A) since the connection aperture 21 is provided to the top face 11U of the casing 11.

As shown in FIG. 3A, the base end portion of the air supply tube 52 is joined to the outer peripheral face of the inner peripheral cylindrical portion 42, and plural individual restricted portions 56 (two in the present exemplary embodiment) are provided at the base end portion of the air supply tube 52, piercing through a peripheral wall portion of the inner peripheral tubular portion 42 and communicating with the inside of the jig insertion hole 44.

The restricted portions 56 of the inner peripheral tubular portion 42 are formed as through holes each of circular cross-sectional shape, with a uniform internal diameter along the whole of their length, the internal diameter thereof being smaller than the internal diameter of the air supply tube 52. The inner peripheral ends of the restricted portions 56 are open at an intermediate portion of the inner peripheral face of the inner peripheral tubular portion 42, and form air supply apertures 58 of circular shape in the inner peripheral face of the inner peripheral tubular portion 42.

The internal space within the high pressure hose 24, the air supply tube 52 and the restricted portions 56 configures an air supply path 60 for supplying compressed air generated by the air compressor into the liquid agent container 18 or to the liquid pressurization and supply chamber 40.

Hole Piercing Member

Figure 3C:
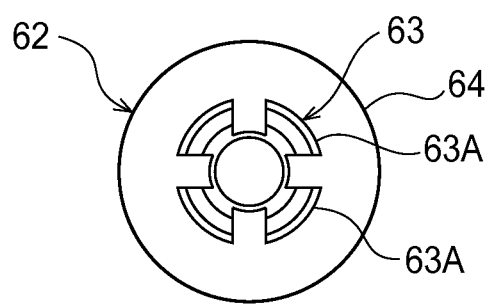
FIG. 3C is a view of the hole piercing member of FIG. 3A, as seen from below.

As shown in FIG. 3A, an axial portion 63 of a piercing member 62 made from a synthetic resin is inserted into the jig insertion hole 44 at the liquid pressurization and supply chamber 40 side. As shown in FIG. 3B and FIG. 3C, the cross-sectional shape of the axial portion 63 is of substantially circular cylindrical shape, and plural silts are provided extending from the bottom end to the top end thereof, sectioning the axial portion 63 into four around the circumferential direction. The diameter of the axial portion 63 that has been sectioned into four sectioned bodies 63A can be changed by tilting each of the sectioned bodies 63A in the same direction. Note that the maximum change in diameter of the axial portion 63 is at the bottom end of the axial portion 63.

A large diameter portion 64 is formed in the piercing member 62 at a portion at the top end of the axial portion 63, in a circular flange shape spreading out to the radial direction outside. Projection shaped hole piercing portions 66 are formed contiguous to the outer peripheral end portion of the top face of the large diameter portion 64, in order to pierce the aluminum seal 30 easily.

As shown in FIG. 3A and FIG. 3B, protrusion portions 44A are formed at the liquid pressurization and supply chamber side of the opening portion of the jig insertion hole 44, the protrusion portions 44A protruding out in the narrowing radial direction of the jig insertion hole 44. Projections 63B are also formed to the inserted axial portion 63, projecting from the outer peripheral face of the sectioned bodies 63A below the protrusion portions 44A. Movement of the piercing member 62 upward (to the aluminum seal 30 side in the present exemplary embodiment) is prevented by the protrusion portions 44A. The piercing member 62 is thereby maintained in a state disposed at the liquid pressurization and supply chamber 40 side of the jig insertion hole 44. In this state, the leading end face of the large diameter portion 64 faces directly toward the center face of the aluminum seal 30, with a small gap present between the large diameter portion 64 and the aluminum seal 30.

As shown in FIG. 3A, a circular cylindrical shaped air-liquid supply tube 74 is integrally formed to the injection unit 20 so as to penetrate through the peripheral wall of the unit main body portion 34. The base end portion of a red colored joint hose 78 is connected through a nipple 76 to the leading end portion at the outer peripheral side of the air-liquid supply tube 74. A valve adapter 80, detachably connectable to a tire valve 102 of the tire 100, is provided at the leading end portion of the joint hose 78. The base end side of the air-liquid supply tube 74 is inserted into the liquid pressurization and supply chamber 40. The joint hose 78 is thereby in communication with the inside of the liquid pressurization and supply chamber 40 through the air-liquid supply tube 74.

As shown in FIG. 2, a groove 25 is formed to the rear side wall face 11R of the casing 11, in order to store the joint hose 78 and the valve adapter 80, and the joint hose 78 and the valve adapter 80 are usually fitted into and stored in the groove 25. In the stored state of the joint hose 78 and the valve adapter 80 in the groove 25, when the device is upright, a portion of the joint hose 78 is disposed above the liquid surface of the sealing agent 32 contained in the liquid agent container 18 (see FIG. 4A).

Jig

Explanation will now be given of the jig 82 employed when letting the sealing agent 32 flow out from the sealing and pump-up device 10.

Figure 5A:
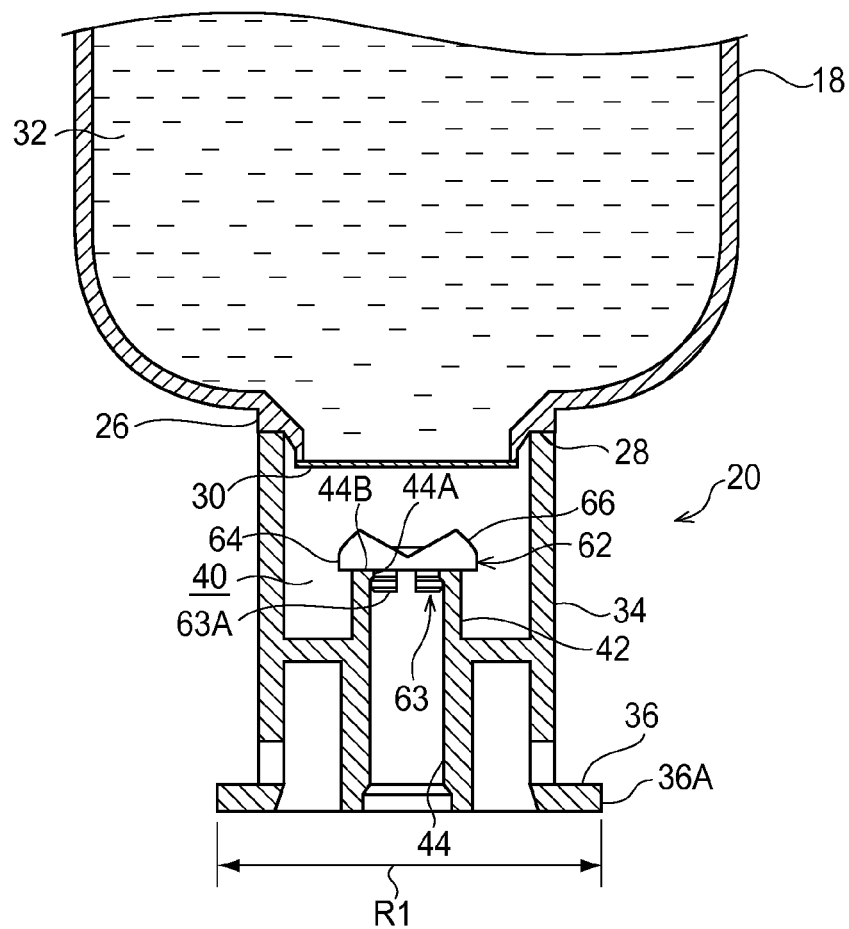
FIG. 5A is a cross-section showing a configuration of a liquid agent container, an injection unit and a jig.
Figure 5B:
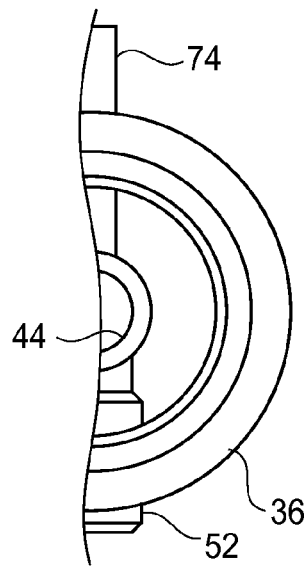
FIG. 5B is a bottom face view of the injection unit of FIG. 5A.
Figure 5C:
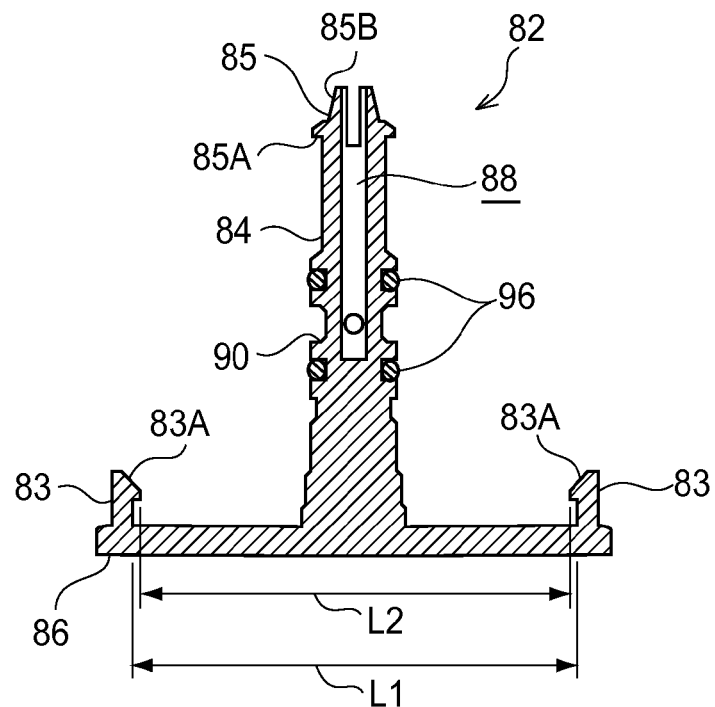
FIG. 5C is a cross-section of a jig.
Figure 5D:
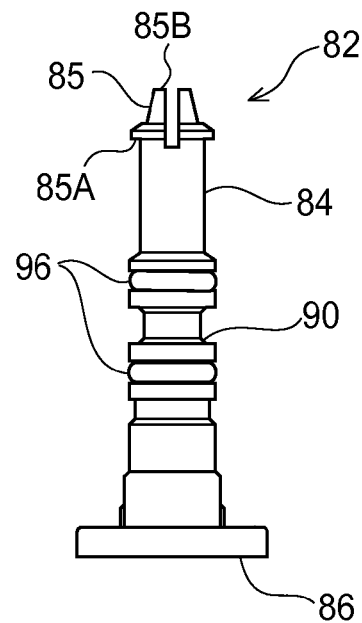
FIG. 5D side face view of the jig of FIG. 5C.

As shown in FIG. 5C and FIG. 5D, the jig 82 (formed from a synthetic resin in the present exemplary embodiment, for example PP, PE, Nylon or the like), is provided with a bar shaped insertion portion 84 for insertion into the jig insertion hole 44 and a substantially rectangular shaped base portion 86 formed to the base end of the insertion portion 84. Note that the base portion 86 is an example of an extending portion.

A jig communication path 88 is formed in the insertion portion 84, the jig communication path 88 extending from the leading end face of the insertion portion 84 toward the base portion 86 side, and curving around to extend out toward the outer peripheral side at an intermediate portion. An annular shaped communication groove 90 is formed in the outer peripheral surface of the insertion portion 84, forming an airway to the opening portion of the jig communication path 88.

A pair of fitting insertion grooves are formed in the outer peripheral surface of the insertion portion 84, respectively above and below the communication groove 90. O-rings 96 are respectively fitted into the pair of fitting insertion grooves.

As shown in FIG. 5C and FIG. 5D, the external outline of a leading end portion 85 of the insertion portion 84 is shaped so as to spread out radially from the leading end toward the base portion 86. Namely, the leading end portion 85 is formed in substantially a cone shape. A step 85A is formed at the boundary of the leading end portion 85 with other portions of the insertion portion 84, and the diameter of the outer peripheral edge of the step 85A is a greater diameter than the diameter of the internal peripheral edge of the protrusion portions 44A. Four slits 84A are formed to the insertion portion 84 at a fixed interval around the circumferential direction of the insertion portion 84, extending from the leading end of the leading end portion 85 towards the base portion 86, and the slits 84A have end faces positioned between the step 85A and the upper O-ring 96. The leading end portion 85 is therefore sectioned around the circumferential direction into four sectioned bodies 85B, and the diameter of the leading end portion 85 can be changed by tilting each of these sectioned bodies 85B in the same direction. Note that the change in diameter of the leading end portion 85 is greatest at the leading end of the leading end portion 85.

When passing through the jig insertion hole 44, the leading end portion 85 changes diameter (compresses in diameter) by enough to enable passage through the jig insertion hole 44, and when it has passed out through the jig insertion hole 44, the leading end portion 85 changes diameter to return to its original diameter. Consequently, after the leading end portion 85 has passed out through the jig insertion hole 44, even if force acts on the jig 82 in the removal direction, the step 85A catches on the edge 44B of the jig insertion hole 44, and prevents movement of the jig 82 in the removal direction.

It should be noted that the positions of the step 85A of the leading end portion 85 and the edge 44B are set such that the position of the jig 82 when the step 85A catches on the edge 44B is further to the insertion aperture side (the bottom side of the device in the present exemplary embodiment) of the jig insertion hole 44 than the hole piercing position of the jig 82 when the hole piercing portions 66 of the piercing member 62, being pressed out by the jig 82, pierce the aluminum seal 30 (a hole is punctured).

Support columns 83 capable of resilient deformation are provided in the vicinity of two ends of the face of the base portion 86 formed with the insertion portion 84, and claws 83A, of triangular profile in side view, are integrally formed at the leading end side of the support column 83, to the side face of the insertion portion 84 side.

As shown in FIG. 5A and FIG. 5C, the diameter R1 of the foot portion 36 of the injection unit 20 is set to be substantially the same as a separation L1 of the support columns 83, and set to be wider than a separation L2 of the claws 83A.

Figure 6:
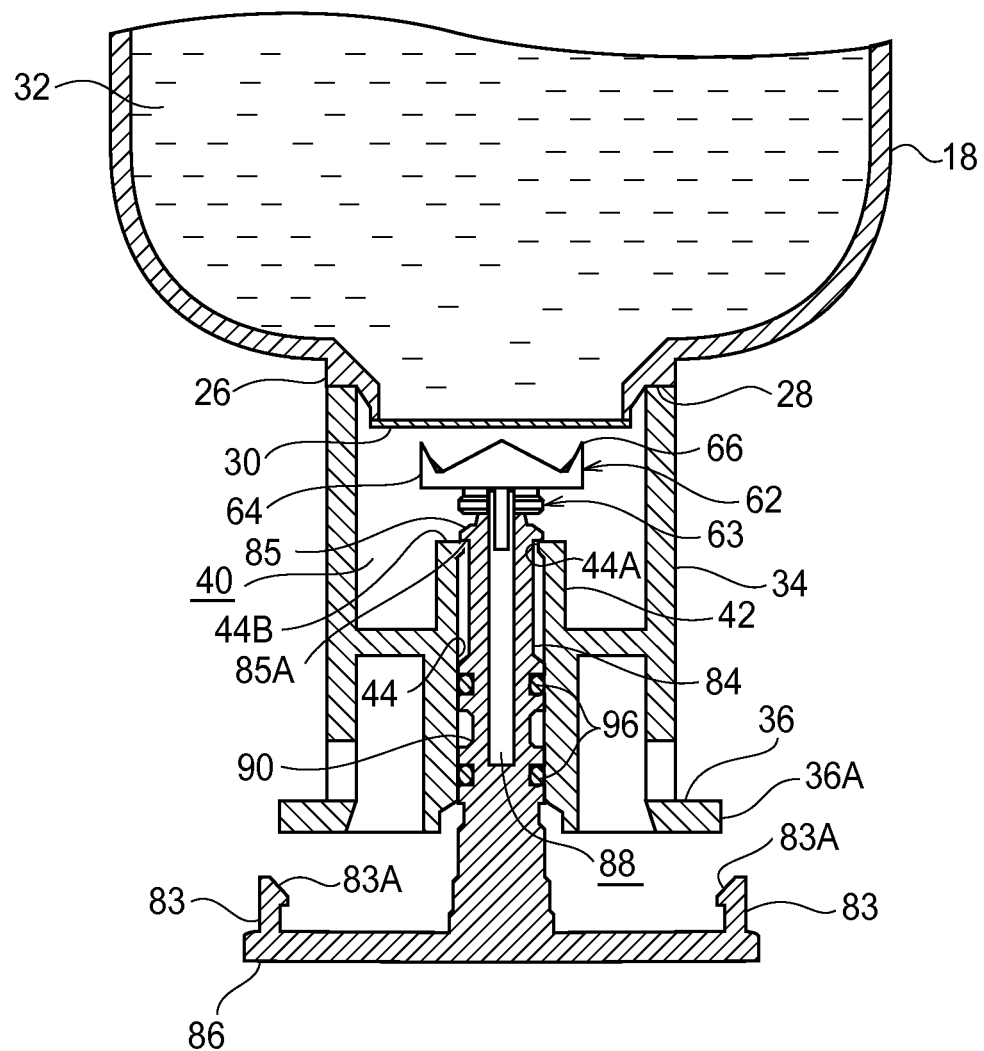
FIG. 6 is a cross-section of a liquid agent container and an injection unit in a state before a hole piercing member, pressed out with a jig, pierces an aluminum seal.

The length of the insertion portion 84 is slightly longer than the dimension from the bottom end of the jig insertion hole 44 to the aluminum seal 30. By so doing, when the entire insertion portion 84 of the jig 82 is inserted into the jig insertion hole 44, as shown in FIG. 6, the piercing member 62 is reliably pushed out from within the jig insertion hole 44, and the top end portion of the jig 82 intrudes into the liquid agent container 18.

In the state in which the entire insertion portion 84 is inserted into the jig insertion hole 44, the communication groove 90 of the insertion portion 84 and the air supply ports 58 of the restricted portions 56 are aligned with each other in the axial direction. The air supply path 60 is thereby in communication with the jig communication path 88 of the jig 82 through the communication groove 90.

The edge portions at the outer peripheral side of each of the pair of O-rings 96 are pressed along the entire circumferential direction toward the inner peripheral face of the jig insertion hole 44 when the insertion portion 84 is in the inserted state within the jig insertion hole 44. The jig insertion hole 44 is thereby in a closely sealed state with both above and below the air supply ports 58 closed off by the insertion portion 84 and the pair of O-rings 96. It should be noted that the position of the claws 83A of the support columns 83 is set such that the position of the jig 82 when the above described claws 83A catch on the edge portion of the foot portion 36 is a position that can maintain a state with the leading end side of the insertion portion 84 intruding into the liquid agent container 18.

Operation of the Sealing and Pump-Up Device

Explanation will now be given of the operational procedure of repairing a punctured tire 100 by employing the sealing and pump-up device 10 of the present exemplary embodiment. Explanation (in text and illustrations) of the following procedures (1) to (8) is given in the above mentioned operation manual 17.

(1) When a puncture occurs in the tire 100, an operator first inserts the insertion portion 84 of the jig 82 into the jig insertion hole 44 of the sealing and pump-up device 10. When the insertion portion 84 presses the piercing member 62, the diameter of the axial portion 63 of the piercing member 62 changes (diameter compresses), and the projections 63B pass over the protrusion portions 44A. Then the piercing member 62, which is being pressed by the leading end portion 85 of the insertion portion 84, moves toward the aluminum seal 30. After the leading end portion 85 in the compressed diameter state has passed through the jig insertion hole 44 it returns to its original diameter under its own resilience.

When the claws 83A pass the foot portion 36, the sloping faces of the claws 83A are pressed by an outer peripheral face 36A of the foot portion 36, and the support column 83 resiliently deforms, however when the base portion 86 of the jig 82 is inserted up to making contact with the foot portion 36 of the injection unit 20, the claws 83A have passed the outer peripheral face 36A of the foot portion 36 and return under their own resilience, the claws 83A catch on the edge portion of the foot portion 36, and movement in the removal direction is prevented.

Figure 7A:
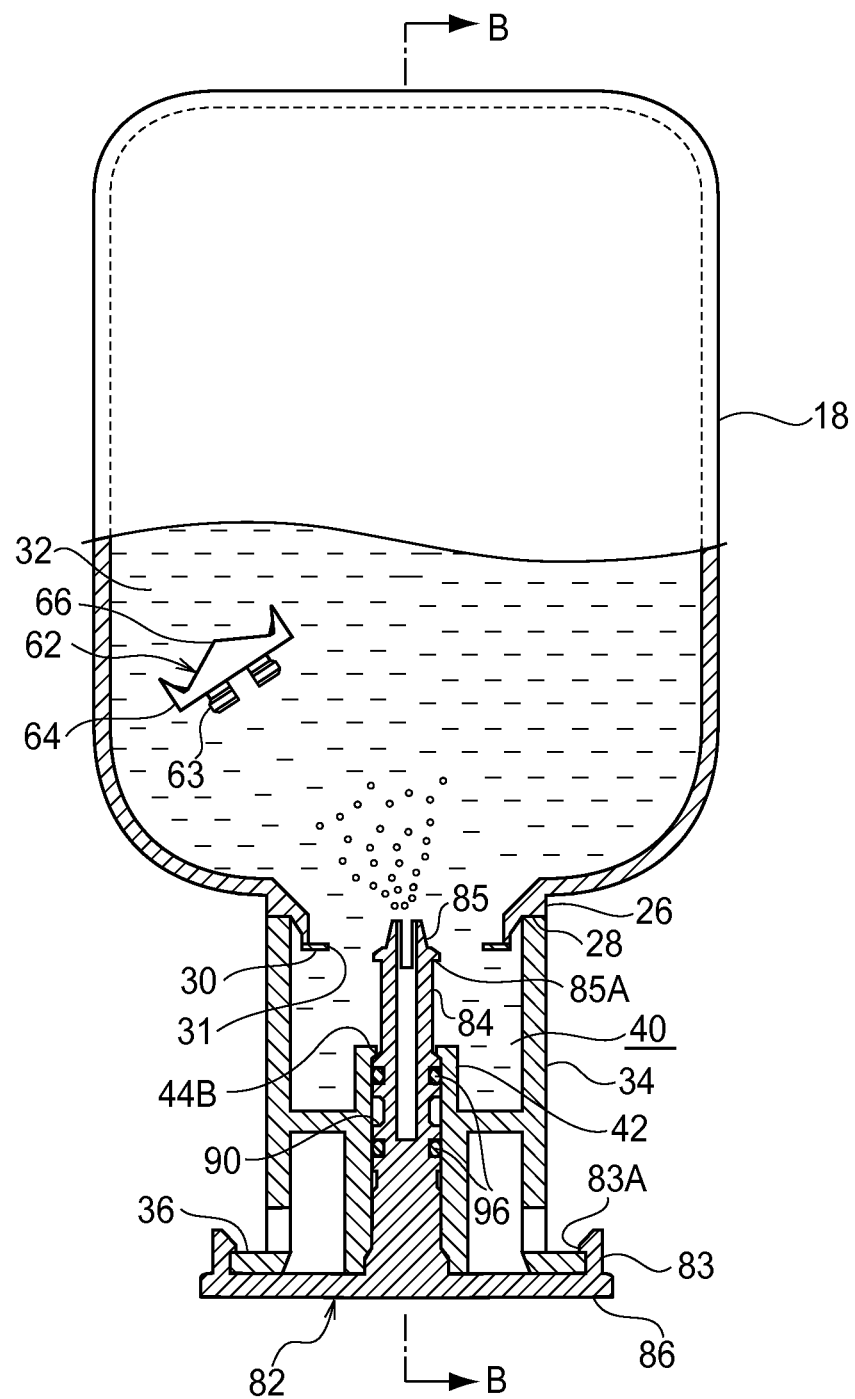
FIG. 7A is a cross-section of a liquid agent container and an injection unit showing a state after the hole piercing member has pierced the aluminum seal.
Figure 7B:
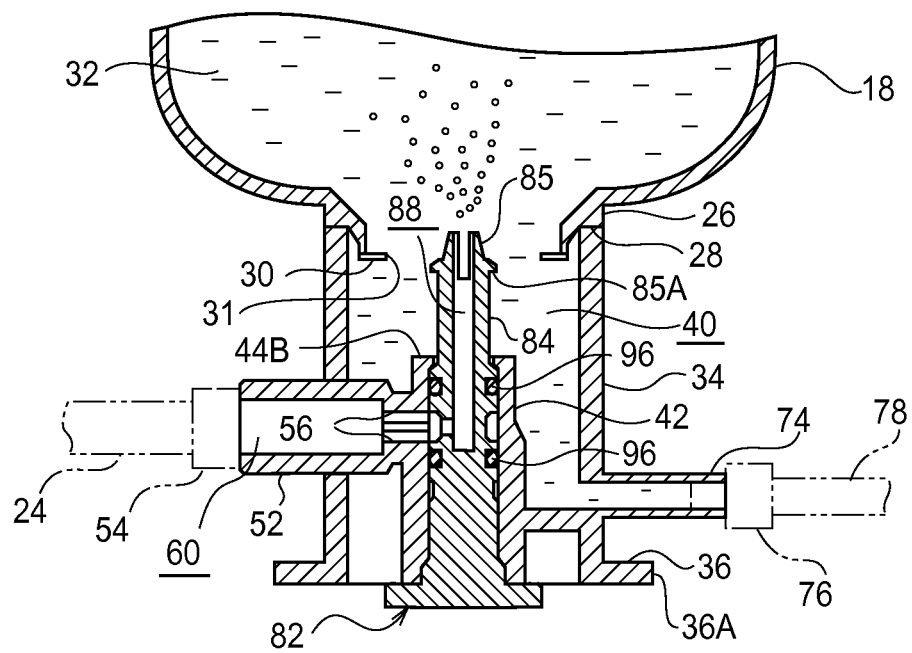
FIG. 7B is a cross-section taken on line B-B of FIG. 7A.

Thereby, the hole piercing portions 66 of the piercing member 62, being pressed by the insertion portion 84, pierce the aluminum seal 30 and are pushed into the container, and the leading end portion 85 of the insertion portion 84 intrudes into the liquid agent container 18 (see FIG. 7A and FIG. 7B). When this occurs, the jig 82 is moved further into the jig insertion hole 44 from the end at the entrance side thereof, while the pair of O-rings 96 disposed at the outer peripheral face of the insertion portion 84 press against the inner peripheral face of the jig insertion hole 44. Part way through this movement the O-ring 96 disposed at the top of the insertion portion 84 is made to pass to the inner peripheral side of the air supply ports 58.

After this, the sealing and pump-up device 10 is placed, for example, on a road surface of the like so that the foot portion 36 is at the bottom and the liquid agent container 18 is at the top (the upright state, see FIG. 1, FIG. 2 and FIG. 4).

When the insertion portion 84 of the jig 82 has been inserted within the jig insertion hole 44 of the injection unit 20, as shown in FIG. 6, the leading end portion 85 of the insertion portion 84 projects out from the leading end of the inner peripheral tubular portion 42, passes through a hole 31 opened in the aluminum seal 30 by the piercing member 62, and intrudes into the liquid agent container 18. The sealing agent 32 in the liquid agent container 18 flows out through the hole 31 toward the liquid pressurization and supply chamber 40.

(2) Next, the black color (BLACK) air hose 50 is pulled out from the groove 23, and the valve adapter 22 of the air hose 50 is connected to the connection aperture 21 provided to the top face 11U of the casing 11 (see FIG. 4A).

(3) Next, the red color (RED) joint hose 78 is taken out from the groove 25, and the valve adapter 80 of the joint hose 78 is connected to the tire valve 102 of the tire 100 (see FIG. 4A), communicating the liquid pressurization and supply chamber 40 with the inside of the tire 100 through the joint hose 78.

(4) The plug 15 is inserted into a socket, such as a socket of a cigarette lighter or the like installed in a vehicle.

(5) The engine of the vehicle is turned on.

(6) The power switch 13 is switched on, and the compressor unit 12 is actuated. The compressed air generated by the compressor unit 12 is supplied into the liquid agent container 18 through the air supply path 60 and the jig communication path 88 (see FIG. 7A and FIG. 7B).

When compressed air is fed into the liquid agent container 18, the compressed air rises to the top of the sealing agent 32 within the liquid agent container 18, and a space (air layer) is formed in the liquid agent container 18 above the sealing agent 32. The sealing agent 32, pushed by the air pressure from the air layer, is fed into the liquid pressurization and supply chamber 40 through the hole 31 opened in the aluminum seal 30, and injected from within the liquid pressurization and supply chamber 40 into the pneumatic tire 100 through the joint hose 78.

Note that after all of the sealing agent 32 in the liquid agent container 18 has been expelled, the sealing agent 32 in the liquid pressurization and supply chamber 40 is pressurized and pushed through the joint hose 78 and fed into the pneumatic tire 100. Then, when all the sealing agent 32 has been ejected from the liquid pressurization and supply chamber 40 and the joint hose 78, compressed air is injected into the tire 100 through the liquid agent container 18, the liquid pressurization and supply chamber 40 and the joint hose 78.

(7) Next, when an operator has confirmed with the pressure gauge 16 that the internal pressure of the tire 100 is the stipulated pressure, then the power switch 13 is switched off and the compressor unit 12 halted, and the valve adapter 80 is removed from the tire valve 102.

Within a specific period of time after finishing inflating the tire 100 the operator performs preparatory running of the tire by traveling a specific distance (for example 10 km) using the tire 100 that has been injected with the sealing agent 32. The sealing agent 32 within the tire 100 thereby spreads out uniformly, the sealing agent 32 fills the puncture hole and seals the puncture hole.

(8) After completing preparatory running, the operator connects the valve adapter 22 of the air hose 50 to the tire valve 102 of the tire 100, as shown in FIG. 4B, and remeasures the internal pressure of the tire 100 using the pressure gauge 16. If the stipulated pressure is not met, then the compressor unit 12 is re-actuated and the tire 100 is pressurized to the stipulated internal pressure. Puncture repair of the tire 100 is thereby completed and it is possible to drive using the tire 100 within a specific distance range while not exceeding a specific speed (for example not exceeding 80 km/h).

In the sealing and pump-up device 10 of the present exemplary embodiment, when the jig 82 is inserted into the jig insertion hole 44 until the base portion 86 of the jig 82 makes contact with the bottom portion of the injection unit 20, the piercing member 62 is pressed up and pierces a hole in the aluminum seal 30, and the leading end portion 85 intrudes into the liquid agent container 18. When this occurs, since the O-rings 96 are in press contact with the internal peripheral face of the jig insertion hole 44 (the internal peripheral face of the inner peripheral cylindrical portion 42), the sealing agent 32 and the compressed air are prevented from leaking out, and in addition the claws 83A catch on an edge portion of the foot portion 36, preventing the jig 82 from moving in a removal direction, and the leading end portion 85 is maintained in an intruded state into the liquid agent container 18.

When this occurs, the leading end portion 85 returns to its original diameter state when it has passed through the jig insertion hole 44, and even if, hypothetically, the claws 83A are not catching on the edge portion of the foot portion 36 when the piercing member 62 pierces a hole in the aluminum seal 30, since the step 85A catches on the edge 44B of the jig insertion hole 44, the jig 82 is prevented from moving in the removal direction (see FIG. 6). Thereby there is reliable improvement in problems with which a puncture cannot be repaired, such as the jig 82 coming out from the jig insertion hole 44, the sealing agent 32 flowing out from the jig insertion hole 44, compressed air leaking out from the jig insertion hole 44 or the like.

Consequently, in the sealing and pump-up device 10 of the present exemplary embodiment, installation operation of the jig 82 is simple, and reliable operation can be made without the jig 82 coming out even if pressure is exerted thereon.

Since the leading end portion 85 is intruding into the liquid agent container 18 in the installation state of the jig 82, and since compressed air from the air compressor is directly supplied into the liquid agent container 18 through the jig communication path 88, the time for the sealing agent to flow out from the liquid agent container into the liquid supply chamber can be decreased.

Moreover, since catching portions to prevent movement of the jig 82 in the removal direction are provided as edge portions of the jig insertion hole 44, there is no need to provide separate dedicated catching portions.

Furthermore, when the sealing agent 32 and compressed air are injected, force (pressure×the surface area of the insertion portion 84) acts on the insertion portion 84 of the jig 82 in the removal direction from the jig insertion hole 44, however, since the claws 83A provided to the jig 82 catch on the foot portion 36 of the injection unit 20 in the manner shown in FIG. 6, the jig 82 does not come out from the jig insertion hole.

When the pressure here from the compressed air acts on the insertion portion 84 that has been inserted in the jig insertion hole 44, the insertion portion 84 presses a central portion of the base portion 86, and bending deformation occurs such that the base portion 86 deforms, about the claws 83A on both sides as fulcra, so that the central portion protrudes. When the base portion 86 deforms in this manner, the support columns 83 tilt in a direction to press the edge portions of the foot portion 36, and a desirable mode is obtained in which the catching of the claws 83A onto the edge portions of the foot portion 36 tends to get stronger.

Note that the leading end portion 85 is preferably set so as to be able to withstand 3 times the maximum pressure of the air compressor in the state in which the step 85A is catching on the edge 44B of the jig insertion hole 44 (setting the withstandable strength to be 3 times the maximum pressure of the air compressor or greater).

Second Exemplary Embodiment

Explanation will now be given of a second exemplary embodiment of a sealing and pump-up device, based on FIGS. 8A to 8C. The sealing and pump-up device of the second exemplary embodiment is of substantially the same configuration as that of the first exemplary embodiment, except that the jig and jig related parts of the configuration differ from those of the first exemplary embodiment. The same reference numbers will be allocated to similar components to those of the first exemplary embodiment, and explanation will be omitted.

Figure 8A:
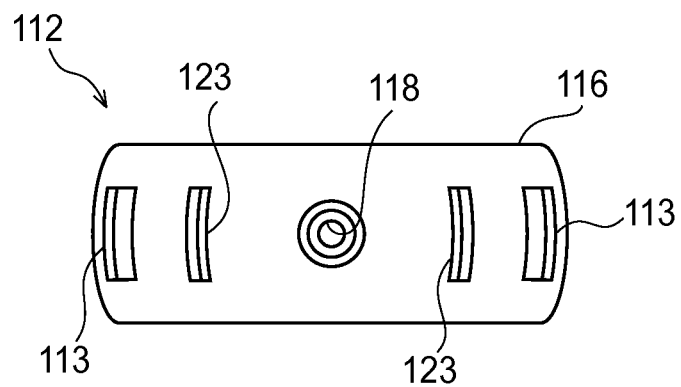
FIG. 8A is a plan view of a jig according to a second exemplary embodiment.
Figure 8B:
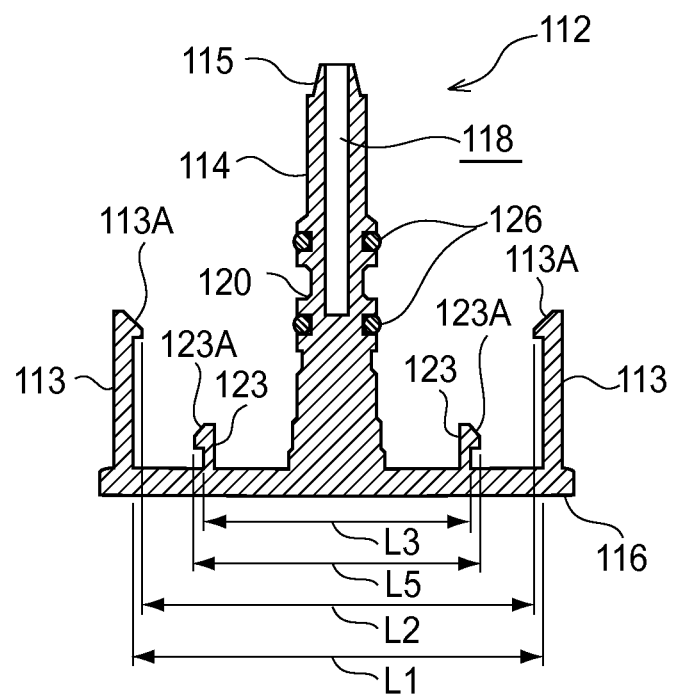
FIG. 8B is a cross-section of the jig of FIG. 8A.
Figure 8C:
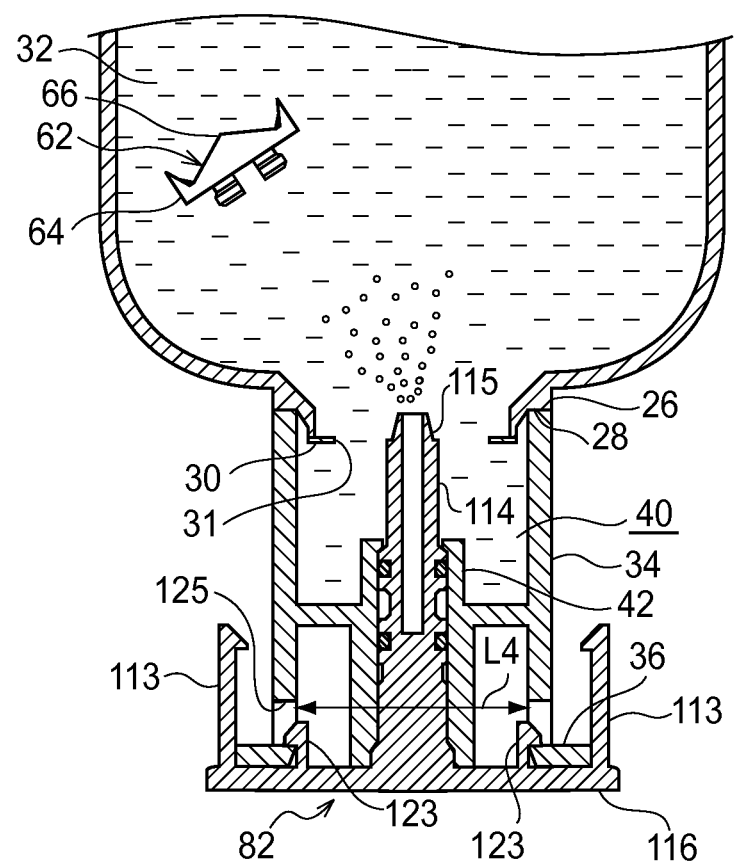
FIG. 8C is a cross-section of a liquid agent container and an injection unit showing a state after the hole piercing member of FIG. 8A has pierced an aluminum seal.

As shown in FIG. 8A to FIG. 8C, a jig 112 of the present exemplary embodiment differs from the jig 82 of the first exemplary embodiment in the support columns and claws provided to the leading end portion and base portion.

The jig 112 is equipped with a bar shaped insertion portion 114 for insertion into the jig insertion hole 44 and substantially rectangular shaped base portions 116 formed to the base end portion of the insertion portion 114. Note that in the jig 112 of the present exemplary embodiment, the length of the insertion portion of the disposal of the O-rings, and the like, are similar to those of the jig 82 of the first exemplary embodiment.

A leading end portion 115 of the insertion portion 114 is a tapered shape, and is formed to the leading end face thereof so as to be able to press a piercing member 62.

The face of the base portion 116 formed with the insertion portion 114 is equipped, in the vicinity of both ends, with resiliently deformable first support columns 113 that stand up orthogonally from the base portion 116, and with first claws 113A that are integrally formed in a triangular shape in side view to side faces of the first support columns 113, at the leading end side and insertion portion 114 side of the first support columns 113.

It should be noted that the position of the jig 112 when the previously mentioned first claws 113A catch on the edge portion of the foot portion 36 is set to be further to the insertion hole side (the bottom side of the device in the present exemplary embodiment) of the jig insertion hole 44 than when, due to being pushed out by the jig 112, the hole piercing portions 66 of the piercing member 62 pierce the aluminum seal 30 (a hole is punctured).

As shown in FIG. 8C, a separation L1 of the first support columns 113 is set to be substantially the same as a diameter R1 of the foot portion 36 of the injection unit 20, and set to be wider that a separation L2 of the first claws 113A.

There are also resiliently deformable second support columns 123 formed standing up orthogonally from the base portion 116, further to the insertion portion 114 side than the first support columns 113. Second claws 123A of triangular shape in side view are integrally formed to the leading end side and insertion portion 114 side of the second support columns 123.

As shown in FIG. 8C, a separation L3 of the outer peripheral faces of the second support columns 123 is set so as to be substantially the same as a separation L4 of a pair of engaging holes 125 that are formed to the outer peripheral face of the unit main body portion 34 of the injection unit 20, and set so as to be narrower than a separation L5 between the outer peripheral edges of the second claw 123A.

Note that the position of second claws 123A on the second support columns 123 is set so that a position capable of maintaining a state in which the leading end side of the insertion portion 114 intrudes into the liquid agent container 18 is attained when the jig 112 is positioned with the previously mentioned second claws 123A catching on the internal peripheral faces of the engaging holes 125.

Explanation will now be given of operation of the sealing and pump-up device of the second exemplary embodiment. The second exemplary embodiment obtains the following effects in addition to the effects of the first exemplary embodiment.

As shown in FIG. 8C, in the state in which the insertion portion 114 of the jig 112 is inserted into the jig insertion hole 44 (jig installed state), even if the pressure from compressed air acts on the insertion portion 114 that is inserted into the jig insertion hole 44, movement of the jig 112 is prevented in the removal direction since the second claws 123A are catching on the internal peripheral face of the engaging holes 125.

Furthermore, just supposing that when the piercing member 62 pierces the aluminum seal 30 the second claws 123A were not catching on the internal peripheral face of the engaging holes 125, movement of the jig 112 is prevented in the removal direction since the first claws 113A are catching on the edge portion of the foot portion 36. When this occurs, the insertion portion 114 of the jig 112 presses a central portion of the base portion 116, and bending deformation occurs such that the base portion 116 deforms, about the claws 113A on both sides as fulcra, so that the central portion protrudes. When the base portion 116 deforms in this manner, the first support columns 113 tilt in a direction to press the edge portions of the foot portion 36, and a desirable mode is obtained in which the catching of the claws 113A onto the edge portions of the foot portion 36 tends to get stronger.

Thereby there is reliable improvement in problems with which a puncture cannot be repaired, such as the jig 112 coming out from the jig insertion hole 44, the sealing agent 32 flowing out from the jig insertion hole 44, compressed air leaking out from the jig insertion hole 44 or the like.

Note that the first claws 113A and the first support columns 113 are preferably set so as to be able to withstand 3 times the maximum pressure of the air compressor when in a state catching on the edge portion of the foot portion 36 (setting the withstandable strength to be 3 times the maximum pressure of the air compressor or greater).

Other Exemplary Embodiments

In the first and the second exemplary embodiments, it is the hole piercing portions 66 of the piercing member 62 that are configured to pierce (puncture a hole) the aluminum seal 30, however the present exemplary embodiment is not necessarily limited to such a configuration, and the profile of the leading end portion of the insertion portion 84 may be formed with a profile that readily pierces the aluminum seal 30, so as to directly pierce the aluminum seal 30. In such cases, since there is no requirement for the piercing member 62, the component cost can be reduced.

Furthermore, whereas in the first and the second exemplary embodiments configuration was made with the compressor unit 12, the liquid agent container 18, and the injection unit 20 housed within the casing 11, the present invention is not necessarily limited to such as configuration, and, as shown in FIG. 9, configuration may be made with the compressor unit 12 alone housed within the casing 11. Note that in such cases it is necessary to fit a connection aperture 21 to the air supply tube 52 in order to be able to connect the valve adapter 22 of the air hose 50 to the air supply tube 52.

Moreover, whereas in the second exemplary embodiment the engaging holes 125 are formed to the outer peripheral faces of the unit main body portion 34, the present invention is not necessarily limited to such a configuration, and as engaging holes, holes that pierce from the bottom face of the foot portion 36 through to top face thereof may be made employed.

In such cases the second claws 123A are set so as to catch on the edge portions at the outside of such engaging holes.

Note that the present invention is not limited to the above described exemplary embodiments, and, as can be appreciated, various changes and modifications can be made thereto, within a scope encompassed by the scope of the patent claims.

The invention claimed is:

1. A sealing and pump-up device comprising:
   a liquid agent container for containing a sealing agent and having an outlet for the sealing agent closed by a seal member;
   an injection unit connected to the outlet and having a liquid supply chamber that is in communication with the inside of the liquid agent container by piercing a hole in the seal member, and a jig insertion hole that communicates the liquid supply chamber with the outside of the injection unit;
   compressed air supply means that generates compressed air for applying pressure to the sealing agent and for filling a pneumatic tire;
   an air and liquid supply tube that supplies sealing agent that has flowed out from the liquid supply chamber and compressed air to the pneumatic tire;
   a jig that is insertable into the jig insertion hole, and by insertion into the jig insertion hole, directly or indirectly via another member, pierces a hole in the seal member and also closes off the jig insertion hole; and
   first prevention means that, when the jig is in a position inserted into the jig insertion hole and before a hole piercing position of the jig when the seal member is pierced, functions to prevent movement of the jig in a removal direction,
   the first prevention means including a first engaged portion formed to the injection unit, and a first catching portion which is provided at the jig so as to catch on the first engaged portion to prevent movement in the removal direction of the jig that has been inserted in the jig insertion hole.

2. The sealing and pump-up device of claim 1, wherein: the first engaged portion is an edge portion at the liquid supply chamber side of the jig insertion hole; and
   the first catching portion which is provided at an insertion portion of the jig for insertion into the jig insertion hole, and is capable of catching on the edge portion on the liquid supply chamber side of the jig insertion hole after insertion through the jig insertion hole.

3. The sealing and pump-up device of claim 1, wherein:
by insertion of an insertion portion into the jig insertion hole, a leading end side of the insertion portion passes through the hole-pierced seal member and intrudes into the liquid agent container and the insertion portion has an internal communication path that guides the compressed air that has been generated into the liquid agent container in a state in which the leading end side intrudes into the liquid agent container; and
the insertion portion is equipped with second prevention means that prevents movement of the jig in the removal direction when in a state in which the leading end side of the insertion portion is intruding into the liquid agent container.

4. The sealing and pump-up device of claim 3, wherein:
the jig is configured including an extending portion provided to a base portion of the insertion portion and extending in directions orthogonal to the axial direction of the insertion portion on both sides of the insertion portion with the insertion portion therebetween, and including first support columns formed at the two sides of the extending portion and provided at the side of the jig that is provided with the insertion portion; and
the second prevention means is configured including a projection portion projecting out from the injection unit, and including a second claw formed at the leading end side of the first support column and extending toward the insertion portion side so as to catch on an edge portion of the projection portion such that the insertion portion, which has been inserted into the jig insertion hole, is prevented from moving in the removal direction.

5. The sealing and pump-up device of claim 2, wherein:
by insertion of the insertion portion into the jig insertion hole, a leading end side of the insertion portion passes through the hole-pierced seal member and intrudes into the liquid agent container and the insertion portion has an internal communication path that guides the compressed air that has been generated into the liquid agent container in a state in which the leading end side intrudes into the liquid agent container; and
the insertion portion is equipped with second prevention means that prevents movement of the jig in the removal direction when in a state in which the leading end side of the insertion portion is intruding into the liquid agent container.

6. The sealing and pump-up device of claim 5, wherein:
the jig is configured including an extending portion provided to a base portion of the insertion portion and extending in directions orthogonal to the axial direction of the insertion portion on both sides of the insertion portion with the insertion portion therebetween, and including first support columns formed at the two sides of the extending portion and provided at the side of the jig that is provided with the insertion portion; and
the second prevention means is configured including a projection portion projecting out from the injection unit, and including a second claw formed at the leading end side of the first support column and extending toward the insertion portion side so as to catch on an edge portion of the projection portion such that movement of the insertion portion that has been inserted into the jig insertion hole is prevent in the removal direction.

7. The sealing and pump-up device of claim 1, wherein:
the jig is configured including an insertion portion for insertion into the jig insertion hole, and an extending portion provided to a base portion of the insertion portion and extending in directions orthogonal to the axial direction of the insertion portion and on both sides of the insertion portion with the insertion portion therebetween, and including first support columns formed at the two sides of the extending portion and provided at the side of the jig that is provided with the insertion portion; and
the first engaged portion is an edge portion of a projection portion projecting out from the injection unit, and the first catching portion is provided to the leading end side of the first support columns and extending toward the insertion portion side so as to catch on the edge portion of the projection portion.

8. The sealing and pump-up device of claim 7, wherein:
by insertion of the insertion portion into the jig insertion hole, a leading end side of the insertion portion passes through the hole-pierced seal member and intrudes into the liquid agent container and the insertion portion has an internal communication path that guides the compressed air that has been generated into the liquid agent container in a state in which the leading end side intrudes into the liquid agent container; and
the insertion portion is equipped with second prevention means that prevents movement of the jig in the removal direction when in a state in which the leading end side of the insertion portion is intruding into the liquid agent container.

9. The sealing and pump-up device of claim 8, wherein:
the jig has second support columns provided on both sides of the extending portion, further to the insertion portion side than the first support columns; and
the second prevention means includes holes formed to the injection unit and second claws formed to the leading end side of the second support columns, the second claws extending in directions toward the opposite sides to those of the insertion portion side so as to catch on an edge portion of the hole, or on an inner peripheral face of the hole, so as to prevent the insertion portion that has been inserted into the jig insertion hole from moving in the removal direction.

* * * * *